US008429043B2

(12) United States Patent  
Glicksman et al.

(10) Patent No.: US 8,429,043 B2  
(45) Date of Patent: Apr. 23, 2013

(54) FINANCIAL DATA PROCESSOR SYSTEM AND METHOD FOR IMPLEMENTING EQUITY-CREDIT LINKED INVESTMENT VEHICLES

(75) Inventors: Eric Glicksman, New York, NY (US); Spyros Papadakis, New York, NY (US); Yidong Ding, New York, NY (US); Omar Gzouli, New York, NY (US)

(73) Assignee: Barclays Capital Inc., New York, NY (US)

( * ) Notice: Subject to any disclaimer, the term of this patent is extended or adjusted under 35 U.S.C. 154(b) by 1076 days.

(21) Appl. No.: 10/465,462

(22) Filed: Jun. 18, 2003

(65) Prior Publication Data

US 2004/0260643 A1  Dec. 23, 2004

(51) Int. Cl.  
*G06Q 40/00* (2012.01)

(52) U.S. Cl.  
USPC .......................................................... 705/35

(58) Field of Classification Search .................... 705/35, 705/37  
See application file for complete search history.

(56) References Cited

U.S. PATENT DOCUMENTS

| | | | |
|---|---|---|---|
| 3,556,563 A | 1/1971 | Scheinberg et al. | |
| 4,648,038 A | 3/1987 | Roberts et al. | |
| 4,739,478 A | 4/1988 | Roberts et al. | |
| 5,062,666 A | 11/1991 | Mowry et al. | |
| 5,440,106 A | 8/1995 | Duck | |
| 5,557,517 A | 9/1996 | Daughterty, III | |
| 5,704,045 A | 12/1997 | King et al. | |
| 5,742,775 A | 4/1998 | King | |
| 5,970,479 A | 10/1999 | Shepherd | |
| 6,012,925 A | 1/2000 | Kelly et al. | |
| 6,105,007 A | 8/2000 | Norris | |
| 6,321,212 B1 | 11/2001 | Lange | |
| 6,347,307 B1 | 2/2002 | Sandhu et al. | |
| 6,418,419 B1 | 7/2002 | Nieboer et al. | |
| 6,421,653 B1* | 7/2002 | May | 705/36 R |
| 6,725,201 B2* | 4/2004 | Joao | 705/4 |
| 7,024,384 B2* | 4/2006 | Daughtery, III | 705/36 R |
| 7,024,387 B1 | 4/2006 | Nieboer et al. | |
| 7,089,202 B1* | 8/2006 | McNamar et al. | 705/35 |
| 7,219,079 B2 | 5/2007 | Birle, Jr. et al. | |

(Continued)

FOREIGN PATENT DOCUMENTS

| | | |
|---|---|---|
| WO | 0180051 A2 | 10/2001 |
| WO | 0242885 A2 | 5/2002 |

(Continued)

OTHER PUBLICATIONS

Neal, Robert S. Credit derivatives: New financial instruments for controlling credit risk. Economic Review-Rederal Reserve Bank of Kansas City; Second Quarter 1996; 81, 2; ProQuest Central p. 15.*

(Continued)

*Primary Examiner* — Muriel Tinkler

(74) *Attorney, Agent, or Firm* — Morgan Lewis & Bockius LLP

(57) ABSTRACT

A novel investment vehicle comprises a synthetic corporate exchangeable note linked to the equity return and credit of select third parties. A computer system creates, tracks and implements the investment vehicle in accord with program-controlled processing. A highly flexible, cost-efficient security is created having enhanced risk/return characteristics.

32 Claims, 5 Drawing Sheets

U.S. PATENT DOCUMENTS

| | | | |
|---|---|---|---|
| 7,222,094 B2 | 5/2007 | Ross | |
| 7,225,153 B2* | 5/2007 | Lange | 705/37 |
| 2002/0032627 A1 | 3/2002 | Perot et al. | |
| 2002/0077961 A1 | 6/2002 | Eckert et al. | |
| 2002/0147670 A1 | 10/2002 | Lange | |
| 2003/0014345 A1* | 1/2003 | Lim | 705/36 |
| 2003/0093375 A1 | 5/2003 | Green et al. | |
| 2003/0115128 A1 | 6/2003 | Lange et al. | |
| 2003/0135436 A1 | 7/2003 | Birle, Jr. et al. | |
| 2003/0135446 A1 | 7/2003 | Birle, Jr. et al. | |
| 2003/0154153 A1 | 8/2003 | Steidlmayer et al. | |
| 2003/0163400 A1 | 8/2003 | Ross et al. | |
| 2004/0006520 A1 | 1/2004 | Birle, Jr. et al. | |
| 2004/0064398 A1* | 4/2004 | Browne et al. | 705/37 |
| 2004/0167849 A1* | 8/2004 | Yass et al. | 705/37 |
| 2005/0075976 A1 | 4/2005 | Woodruff et al. | |
| 2005/0160034 A1* | 7/2005 | Woodruff et al. | 705/39 |

FOREIGN PATENT DOCUMENTS

| | | |
|---|---|---|
| WO | 02074047 A2 | 9/2002 |
| WO | 03013875 A1 | 2/2003 |
| WO | 03014885 A2 | 2/2003 |
| WO | 03014886 A2 | 2/2003 |
| WO | 03023554 A2 | 3/2003 |
| WO | 2004081748 A2 | 9/2004 |
| WO | 2004104889 A1 | 12/2004 |
| WO | 2005062224 A1 | 7/2005 |

OTHER PUBLICATIONS

Landolf et al. Switzerland. A special report International Tax Review, Suppl. Capital Markets and International Guide to Tax. Jul./Aug. 1997: 43-48.*

Webb, Andy. The Best Derivatives Deals. Global Finance; Feb. 1998; 12, 2; Proquest Central. p. 43.*

Part 1, Section 1275.—Other definitions and special rules, 26 CFR 1.1275-4: Contingent payment debt instruments. (Also §§ 163,249; 1.249-1.) Rev. Rul. 2002-31.

26 CFR 1.1275-2: Special rules relating to debt instruments; 1.1275-4: Contingent payment debt instruments.

Harvard Law Review, Jun. 1991, vol. 104:1857, "Distress-Contingent Convertible Bonds: a Proposed solution to the Excess Debt Problem."

U.S. Bancorp Raises $1.1 Billion Through Offering of U.S. Bancorp Zero-Coupon Convertible Senior Notes, PR Newswire. New York: Jul. 31, 2001.

Weinstein, J., Convertibles are Breaking Records, Global Finance. New York: Apr. 2001. vol. 15, Iss, 4; p. 50, 2 pgs.

Bryant, Julie: "Open enrollment draws questions over choices"; Atlanta Business Chronicle: Apr. 28, 2000.

Kollewe, Julia: "IRS Approves Bond Product Criticized As Tax Dodge, WSJ Says"; Bloomberg L.P., Bloomberg News: May 7, 2002, Tuesday 4:46 AM Eastern Time.

Fujita, Junko, and Sheldrick, Aaron: "Orix Sells $350 Million of Bonds Convertible to Stock"; Bloomberg L.P., Bloomberg News: May 28, 2002, Tuesday 11:14 PM Eastern Time.

Hahn, Avital Louria: "Amid Underwriting Blues, Merrill Sings a Merry Tune in Zero Convert Market: Firm earns $112 million-plus in one day on a pair of jumbo zeros"; Investment Dealers' Digest: IDD pp. 3-4 Nov. 20, 2000 ISSN: 0021-0080.

EIU ViewsWire: "USA finance: Good news for 'coco' buffs"; The Economist Intelligence Unit Ltd: Jul. 25, 2002.

Silverman, Gary: Wall Street high on volatile alchemy: Stock Options: Companies have created a source of low-cost funding from the volatility of shares but this entails risks, says Gary Silverman; The Financial Times Limited, Financial Times (London): Jun. 15, 2001, Friday London Edition 1.

Farr, Lucy: "Contingent Convertibles"; practical U.S./International Tax Strategies: Feb. 13, 2002.

"The 2001 Deals of the Year"; Corporate Finance; p. 72: Euromoney Institutional Investor PLC; Institutional Investor: Jan. 2002.

Springsteel, Ian: "The Convert Boomerang"; Securities Data Publishing; Investment Dealers Digest: Mar. 11, 2002.

The Investing Guys: "Contingent Convertibles—CoCos"; www.investopedia.com: Jul. 28, 2002.

The Investing Guys: "To Convert or Not to Convert"; www.investopedia.com: Jul. 28, 2002.

LJH Global Investments HedgeView, Perspectives on Absolute Return Strategies, Sep. 2001, p. 2 col. 3.

"Medtronic Announces Sale of 1.25 percent Contingent Convertible Debentures Due 2021"; Medtronic New Release, www.medtronic.com: Jul. 28, 2002.

Stempel, Jonathan: "Update: Medtronic Sells $1.75 Billion convertible Bonds"; Reuters: Sep. 6, 2001.

"Article 11 Conversion"; Indenture, Oct. 1, 1989.

Part 1, Section 1275.—Other definitions and special rules, 26 CFR 1.1275-4: Contingent payment debt instruments. (Also §§ 163,249; 1.249-1.) Rev. Rul. 2002-31, 2007.

Offering Memorandum, Tyco, Liquid Yield Option Notes, Nov. 14, 2000.

Offering Memorandum, SPX Corporation, Liquid Yield Option Notes, Jan. 31, 2001.

Offering Memorandum, Danaher Corporation, Liquid Yield Option Notes, Jan. 17, 2001.

U.S. Appl. No. 60/311,574, filed Aug. 10, 2001.

U.S. Appl. No. 60/311,574, filed Aug. 10, 2001 Miscellaneous Incoming Letter.

United Artists Communications, Inc., Securities and Exchange Commission Form 8-K Report and Exhibits, Sep. 11, 1987, pp. 1-132.

26 CFR 1.1275-2: Special rules relating to debt instruments; 1.1275-4: Contingent payment debt instruments, 2002.

Merrill Lynch Prospectus, Jan. 24, 2001.

Pennzoil Co., Securities and Exchange Commission Filing, Amendment No. 3 to Form S-4 Registration Statement, Jun. 30, 1998, pp. 1-221.

"Description of ABC Securities"; Merrill Lynch, Jul. 29, 1991.

* cited by examiner

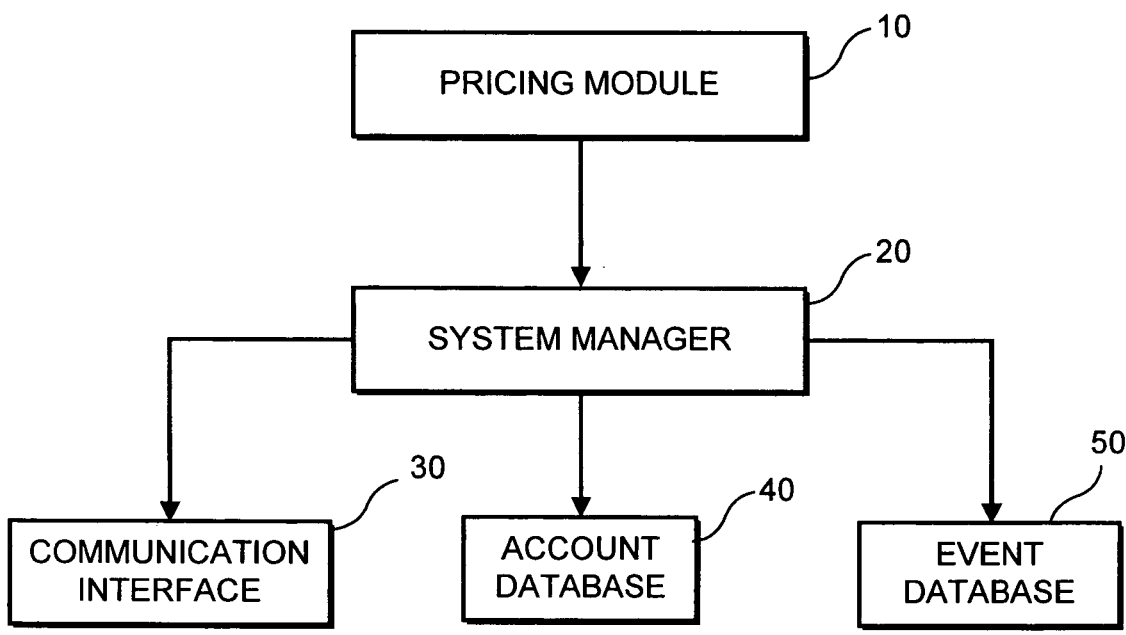
F I G. 1

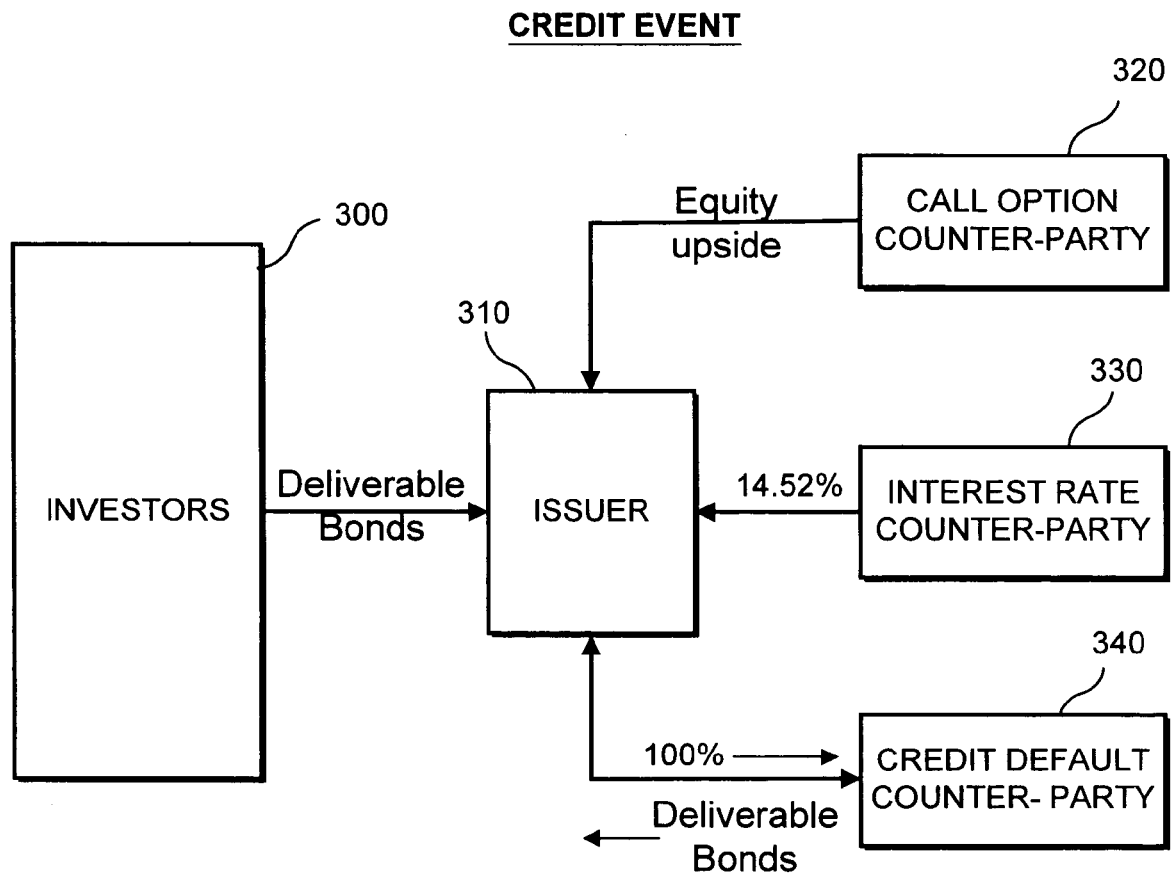
F I G. 4D

FINANCIAL DATA PROCESSOR SYSTEM AND METHOD FOR IMPLEMENTING EQUITY-CREDIT LINKED INVESTMENT VEHICLES

FIELD OF THE INVENTION

The present invention is generally directed to computer systems and methods for implementing novel investment vehicles, and encompasses the specific investment vehicles created and issued in accordance with the program-controlled systems. More particularly, the present invention is directed to a novel equity/credit linked investment vehicle having a select profile defining its operation and performance over time, and the systems for implementing the creation and use of the vehicle for investment purposes.

BACKGROUND OF THE INVENTION

As financial markets have grown, product offerings have increased in capabilities and complexity. Traditional offerings of stocks and bonds have splintered into many different forms of equity and debt instruments, followed by a wave of derivative products linked to these securities. Various levels of risk, rate of return and tax enhanced characteristics are bestowed on these securities to better address client investment needs.

Financial firms have shown incredible creativity in devising a wide spectrum of investment vehicles selectively tailored to the needs of individual and institutional investors. These broad offerings are motivated by the vast universe of different client characteristics that need servicing. These differences include distinct tax rates, portfolio size or available capital, tolerances for risk, domicile and/or residency issues, time horizons, and the like. By way of example, in the case of a client's domicile/residency, the risk tolerance for Panama sovereign debt is much higher for a Panama resident than, perhaps a German resident.

In order to be responsive to such client needs, the financial industry has developed narrower, more focused products with highly tailored profiles of characteristics. These more focused financial instruments, target specific subsets, in, by definition, a smaller client population. More generally, as the products are more tailored to an individual profile, they address fewer clients.

Exemplary, more focused, product offerings that have grown in popularity include: CBOs, CMOs and CDOs (i.e., respectively, collateralized bond, mortgage and debt obligations). Furthermore, these securities are created and issued based on a basket of debt instruments aggregated into a trust or similar assembly which provides the underlying collateral to support the repayment obligation and return per the contract. Many variants exist.

In particular, for equity investors, new products may correspondence to select equity issues or indices. There are many variations of index trusts that have many of the features exhibited by mutual funds but permit intraday trading similar to conventional securities. Having a more retail focus, these included SPDRs®, iShares®, and the like.

Further variations on these more focused instruments included complex trust structures. While no effort is made here to be exhaustive, prior offerings have included RACERS®, an acronym for Restructured Assets Certificates with Enhanced Returns, distributed by the assignee of the present invention. See specifically, a representative description:

NEW YORK—(BUSINESS WIRE)—Apr. 2, 2003—
Standard & Poor's—Standard & Poor's Ratings Services today assigned its 'AA' rating to Restructured Asset Certificates With Enhanced Returns (RACERS) Series 2003-8-C Trust's $10 million credit-linked certificates series 2003-8-C.

The rating reflects the credit quality of the underlying asset, Chase Credit Card Owner Trust 2002-1's class A notes with an expected maturity of Feb. 15, 2007, and a legal final maturity of Jun. 15, 2009 ('AAA'); and the reference obligation, which has been defined to equal the FSR (Financial Strength Rating) of the reference entity, Radian Asset Assurance Inc. ('AA'). The rating also addresses the likelihood of the trust making payments on the certificates as required under the trust agreement.

The trust entered into a credit default swap with Lehman Brothers Special Financing Inc. (Lehman Brothers) as the swap counterparty. At closing, Lehman Brothers made one initial payment to the trust and has no further payment obligations.

Copyright 2003, Standard & Poor's Ratings Services

See also: STEERS™, an acronym for "structured enhanced return trusts" reflecting trust certificates issued by a special purpose trust in select par amounts as distributed by Merrill Lynch & Co.

Lastly, one must include the alternative structures that have significant market appeal, such as convertible bonds—which are debt instruments that permit selective conversion to equity. While very attractive to a broad range of investors, convertible bonds are rigid and narrowly focused on a limited set of securities.

In summary, the various securities available today offer many advantages over prior investment vehicles. In many instances, however, these current investment vehicles have a focus that is often too narrow, or restrictive, limiting demand to a narrow market sector. In addition, current complex securities are difficult to manage effectively and become costly to create, issue and implement.

It was with this understanding of the current investment market that led to the development of the present invention.

OBJECTS AND SUMMARY OF THE PRESENT INVENTION

It is an object of the present invention to provide a novel security that comprises an enhanced combination of linked equity and credit characteristics for distribution to investors.

It is another object of the present invention to provide a novel security that is issued by a selectively created entity, wherein the return of the security includes a potential equity component tied to a third party or index, and the risk of the security is tied to the credit worthiness of a selected third party or index.

It is a further object of the present invention to provide a synthetic corporate exchangeable note that provides a future valuation experience conditioned on a select generic structure, implemented with multiple hedging transactions.

It is another object of the present invention to provide a data processing system for managing and implementing the creation and distribution of structured notes linked to select equity components while having a definable credit rating tied to a known third party entity or component.

It is yet a further object of the present invention to provide a program controlled computer system for selectively pricing and periodically updating account parameters associated with investment in a novel synthetic note linked to the equity return and credit of third party entities.

It is still another object of the present invention to provide a synthetic corporate exchange note that includes internal hedging transactions to support the note and provide for its characteristic risk/return profile. The novel structure may include hedging with a select combination of swap contracts, e.g., a Call Option Swap, an Interest Rate Swap and a Credit Default Swap.

The above and other objects of the present invention are realized in a novel generic equity linked note for use as an investment vehicle with a select structure to provide a particularized risk/return profile. The selectively structured note is a senior unsecured debt security distributed by the administrator or specially created holding company at the undiscounted issue price. While variable, typical maturity will run five years, but actual maturity and payout is contingent on intervening events. To effect proper processing of the note, the administrator links multiple swap contracts to hedge the note, including a Call Option Swap, an Interest Rate Swap and a Credit Default Swap. In this way, the note is linked to an equity investment and a credit risk defined by a third party entity. If no credit events occur, the Call Option provides an equity tied return. However, the occurrence of a credit event terminates the note and triggers the delivery of a pre-set notional amount of actual bonds of the underlying linked credit entity.

In accord with the varying aspects of the present invention, the equity linked notes are implemented by a program controlled digital computer system. System inputs include pricing data associated with the Call Option Swap for supporting the linked equity correspondence of the note. The system monitors periodic events for account support to track issue, maturity and credit event occurrences. In this context, credit events can include events associated with the entity supporting the linked credit, such bankruptcy, default and/or a corporate or debt restructuring.

BRIEF DESCRIPTION OF THE FIGURES

For a more complete understanding of the specific embodiments, FIGS. 1-4A-D are provided as illustrations relating to the practice of the present invention, wherein:

FIG. 1 is a block diagram of core system processing components;

FIG. 2 is a high level processing flow chart;

FIG. 3 is a generic diagram of operating environment; and

FIGS. 4A-D are operating/event diagrams corresponding to Example 1.

DETAILED DESCRIPTION OF THE INVENTION

Figure 2:
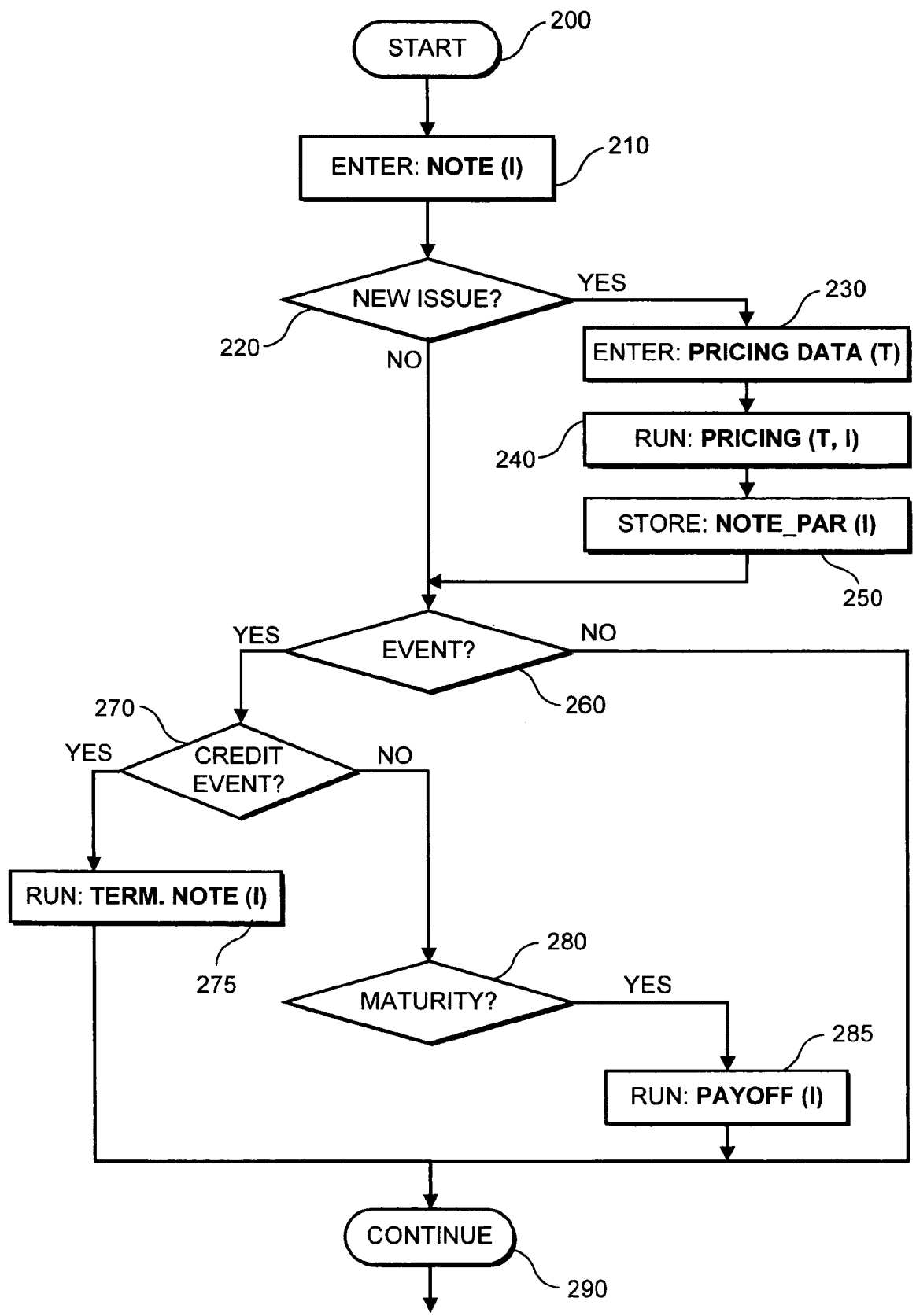

First briefly by way of background, the present invention is directed to a novel security and computer implemented system for managing its creation and processing. The security is a synthetic equity-linked corporate note that has a risk rating tied to a separate credit issue. Through the use of select swap arrangements, the note provides a unique return profile, with a definable credit risk that is different than the issuing entity. A series of credit events are defined that trigger termination of the note prior to maturity and the delivery of underlying securities of the credit sponsoring entity. The rate of return has an equity linked component provided via a call option swap tied to the maturity date of the note.

Note performance is highly flexible and can be custom configured to meet a wide spectrum of investor requirements in terms of risk/return responsiveness. Operation is computer supported with pricing, event tracking and delivery all assisted by program-controlled data processor managed by the system administrator. The issuing entity is typically a holding company by a brokerage firm for entering into the requisite swap agreements. The counter-parties include special purpose entities structured and capitalized to properly effect the swap arrangements.

Turning now to FIG. 1, the system structure of the present invention is provided in block diagram form. In particular, system operation is managed by a system administrator, which is typically a brokerage firm, bank or insurance company. Other administrators may be created or selected, depending on the current regulatory climate in this country or abroad. A brokerage firm is particularly preferred in view of its experience in marketing and managing securities, and the favorable capital structures available. In this context, the administrator has a distributed computer network comprised in block 20 to permit efficient data processing and communication relating to the inventive notes.

Continuing in FIG. 1, block 10 is a pricing module in communication with or coupled to the system manager 20 to take collected market data, note investment criteria and develop pricing constraints for the note creation process and to define the parameters of the various swap contracts necessary to implement note performance. Generally, this pricing module implements per se known pricing algorithms to properly define the swap contract terms and to define the note characteristics to be implemented by system manager 20.

To support the note creation and record-keeping requirements, an account database 40 is linked to the processor for routine account data management and record keeping duties. The database 40 includes non-volatile storage facilities applying magnetic and/or optical digital data storage, controlled and accessed via conventional database tools, such as Oracle® server software or the like. The server environment chosen is not particularly critical, but should be structured to address the volume of data and events to be processed.

As mentioned, note characteristics include tracking of time sensitive events, particularly with reference to credit link securities. These events, and other external information are collected via network communication interface 30, formatted and stored in the event database 50. This provides an historical record of note performance and triggers event sensitive transactions.

System processing of note related events and data is depicted in the flow chart of FIG. 2. Processing conceptually starts at Block 200 with the sequential note file entered at block 210, via the counter (I) used as a note identifier. If a new issue ("Yes" to test 220), logic branches to blocks 230-250 to develop the controlling pricing parameters for the note. Specifically, at block 230, requisite pricing data is entered and the pricing algorithm, PRICING (T, I) is run at block 240 with T providing a time or date counter. The resulting pricing parameters are then stored, block 250.

Continuing in FIG. 2, test 260 assesses whether an event (credit event or maturity date) has occurred. A positive response directs logic to test 270 credit event test, with the note termination, block 275, stemming from a positive response to test 270. If a maturity event is detected, test 280, block 285 processes the pay-off of the note in accordance with the call option swap governing the equity component. Processing passes to block 290 and continues to the next note in sequence.

Figure 3:
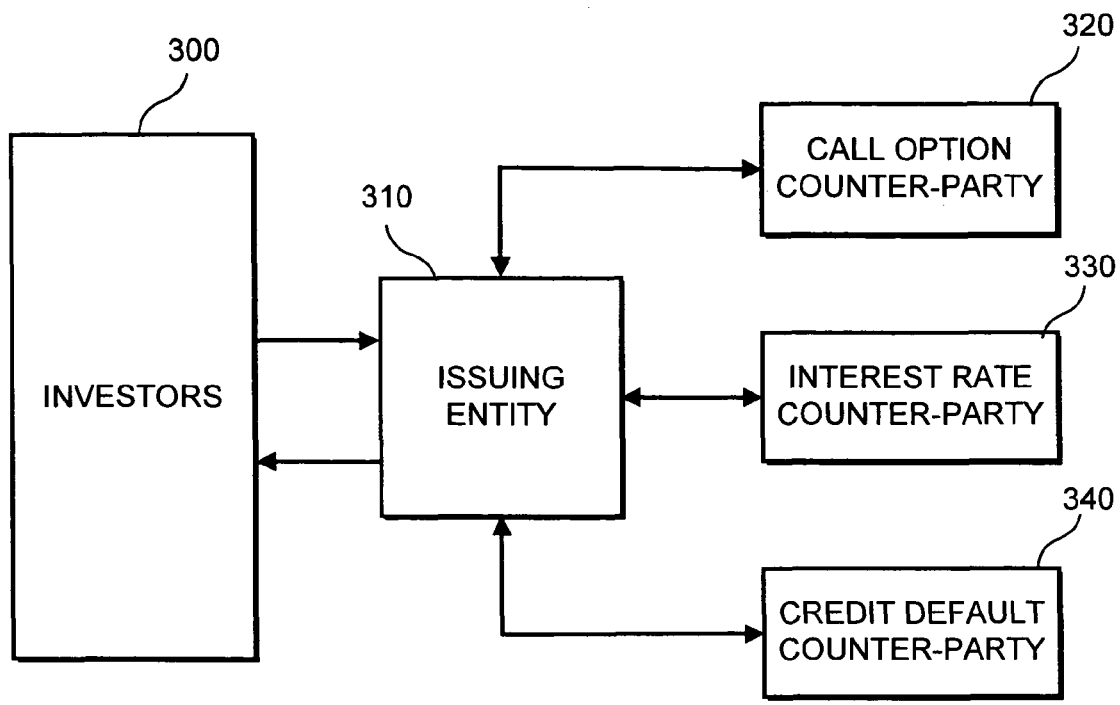

The operating environment and participants for the invention system and investment vehicle are depicted in the block diagram of FIG. 3. Specifically, the investors (purchasers of notes), block 300, transact with the issuing entity, block 310. Investors come from a variety of backgrounds including institutions, high-net work individuals, foreign individuals and entities, and the like. Blocks 320, 330 and 340 depict the counter-party for three separate swap arrangements. These counter-parties are separate entities but may be related to the issuer and/or each other via subsidiary/affiliate corporate structure.

The above operation is made more understandable when taken in the context of a specific, illustrative example, such as Example 1, below:

EXAMPLE 1

The example involves a five (5) year note wherein the underlying equity is GE common stock ("GE") and the linked credit risk is provided by bonds issued by Tyco International, Inc. ("TYC"). Payment streams are expressed as percentages of the notional amount of the note as issued.

Figure 4A:
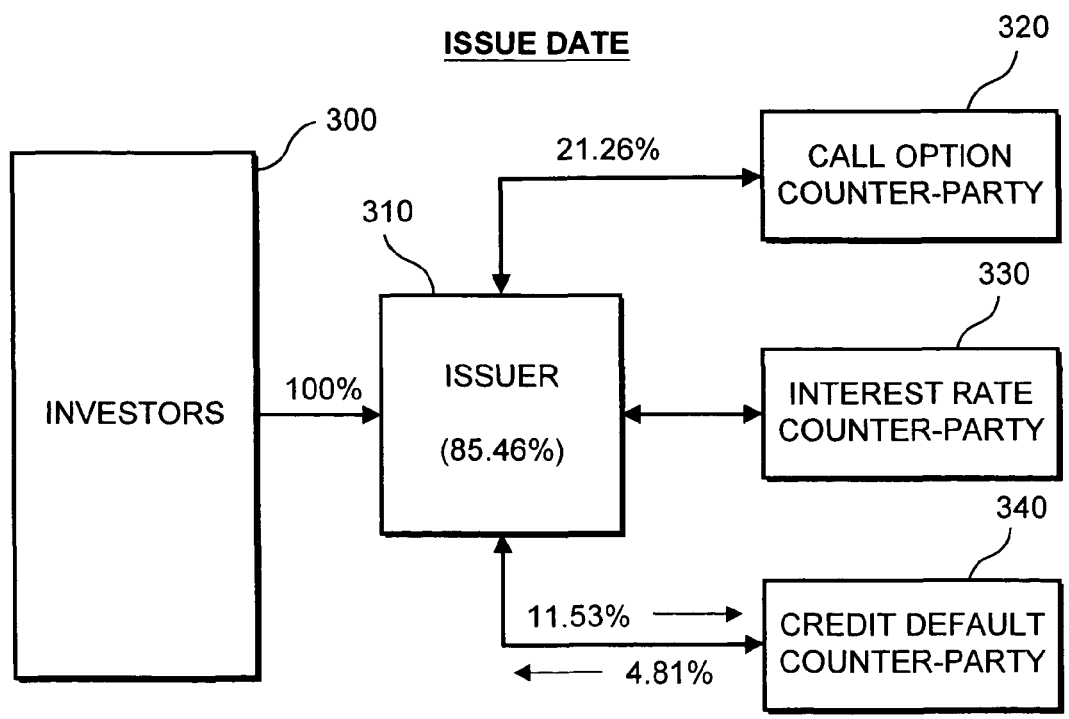

FIG. 4A depicts the initial "issue date" transactions, which include payment of 100% notional value from the investors to the issuer. In addition, the issuer enters into a call option swap with counter-party (320) for 21.26% up-front payment. The issuer enters an interest rate swap with counter-party (330) equal to the funding cost of the retained 85.46%; in this example, a periodic floating payment of Libor (London interbank offering rate) plus 23 basis points (bps).

Finally, the issuer enters into a credit default swap with counter-party (340) that includes an up-front payment of 11.53% to the issuer for the agreement that the issuer will pay 100% to counter-party (340) in exchange for deliverable TYC bonds at a pre-set notional amount, if a "credit event" occurs. For this example, credit events comprise (i) bankruptcy, (ii) missed payment, and (iii) restructuring of debt.

The credit default further includes a bundled up-front payment from the issuer to counter-party (340) of 4.81% to compensate for the early termination risk in the interest rate swap. The net up-front payment, therefore, for this swap is 6.72% from counter-party (340) to the issuer.

Figure 4B:
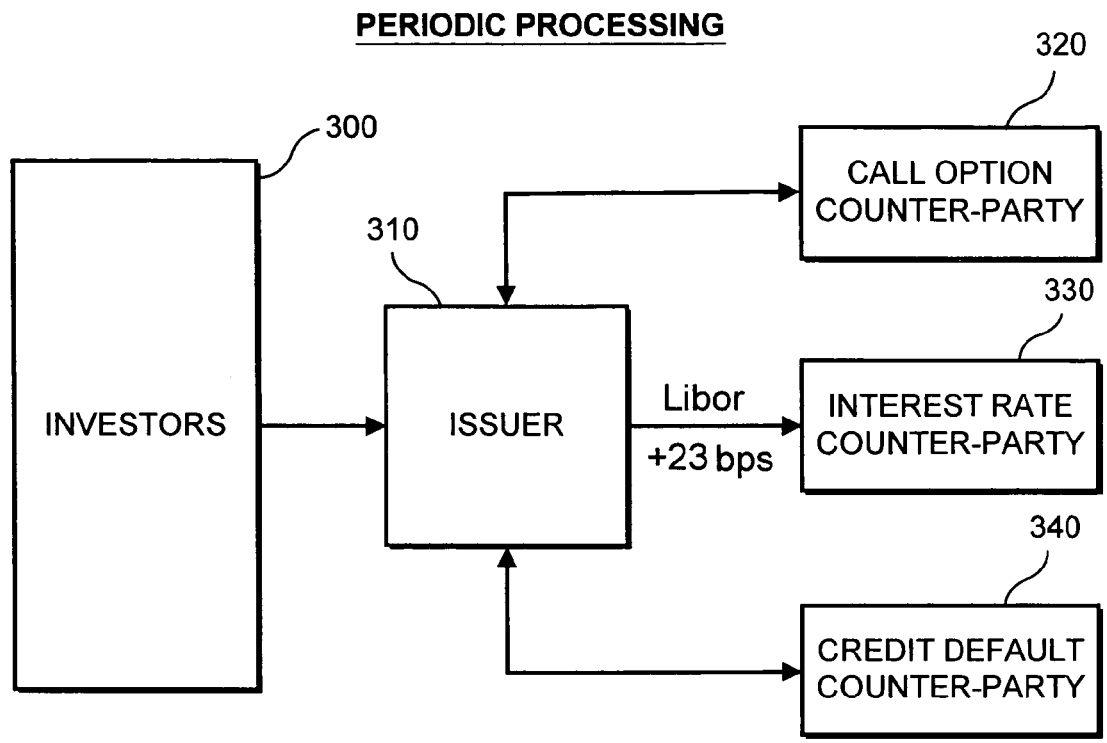

Turning now to FIG. 4B, at periodic intervals after issuance of the note, a cash payment is made to counter-party 330 as defined earlier (e.g., Libor+23 bps).

Figure 4C:
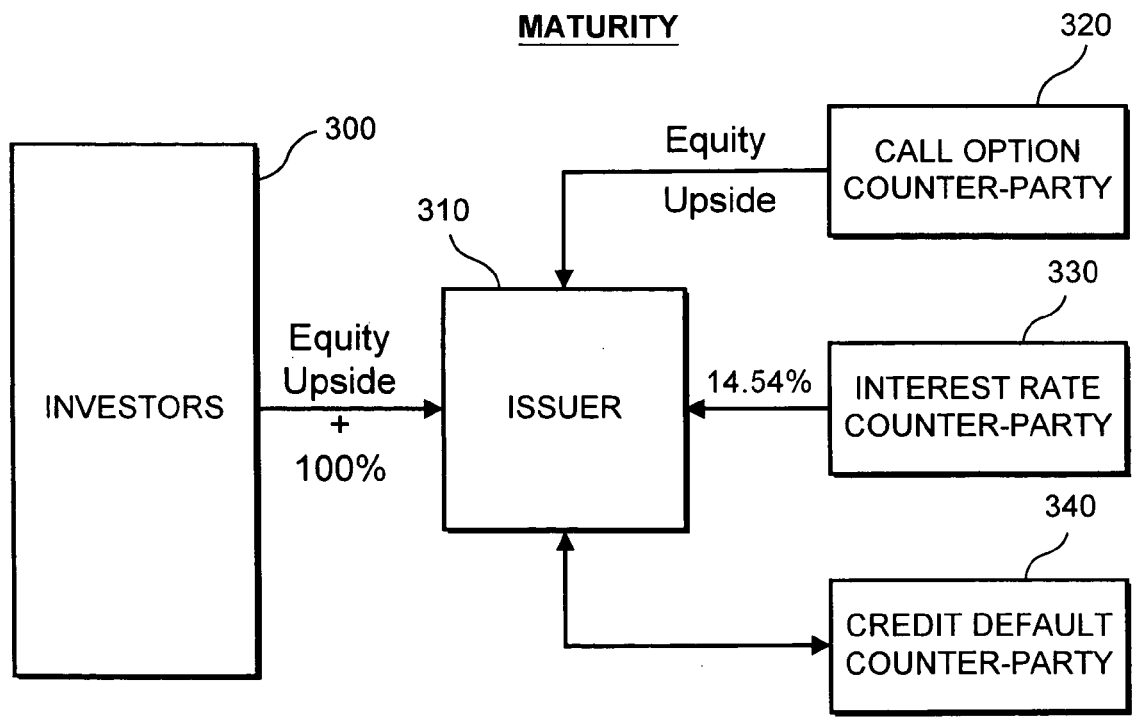

In FIG. 4C, at maturity—and assuming no credit events—the note principal is returned to the investor, in addition with the GE stock appreciation (if any) during the term. To accomplish this, the issuer receives the GE equity upside from counter-party 320 based on the call option swap, and a 14.54% lump sum payment from counter-party 330 in accordance with the terms of the interest rate swap. This 14.54% combines with the 85.46% balance held by the issuer, allowing full 100% payment to the investor.

The final scenario here is reflected in FIG. 4D, triggered by a credit event as defined above. As in 4C, the counter-party 330 provides 14.54% to the issuer, again bringing the balance held by the issuer back to 100%. The issuer pays this 100% to counter-party 340 and receives the actual TYC bonds. The issuer then delivers these bonds to the investor terminating the transaction.

In one arrangement of the above structure, the issuer and three counter-parties are related entities. This imparts a risk to the notes that reflects both the issuer's credit worthiness and the TYC credit worthiness. To isolate the credit on the notes to only TYC, the issuer is structured as an independent trust holding company. In either event, the risk associated with the note is heavily influenced by the credit rating of the underlying bonds—here TYC—perhaps BaZ/BBB. This rating—for lower than a typical issuer—permits a substantial premium to be used in funding the call option swap. In the example above, tying the credit risk to TYC bonds, instead of brokerage supported credit of AZ/A (or better), allows the embedded call option with a value of 21.26% v. 14% for typical AZ/A-rated 100% principal protected equity linked note from the brokerage firm. The higher risk supports a significant increase in equity exposure for the note.

The above description is merely illustrative of select embodiments of the present invention and does not, in any way, act to restrict the variations available to accomplish the inventive features therein. The foregoing inventions are solely limited by the appended claims on this patent.

What is claimed is:

1. A computer system comprising:
   memory operable to store at least one program; and
   at least one processor communicatively coupled to the memory, in which the at least one program, when executed by the at least one processor, causes the at least one processor to:
   access and process data regarding a call option swap, entered into first, with one or more counter-parties and a credit default swap, entered into second, with one or more counterparties;
   access and process data regarding a note that is issued to a noteholder in exchange for payment of a notional value, the note having a maturity date, being associated with one or more credit events, being backed by an equity share in a first entity via the call option swap with one or more counter-parties and having a credit risk rating based on a risk rating of a bond issued by a second entity via the credit default swap with one or more counter-parties;
   wherein, upon occurrence of one of the one or more credit events prior to the maturity date, the bond issued by the second entity is delivered to the noteholder;
   calculate a payment based on a principal value of the note plus any appreciation in a value of the equity share from an issue date of the note to the maturity date of the note if none of the one or more credit events occur prior to the maturity date; and
   track the maturity date of the note and the one or more credit events.

2. The system of claim 1 wherein the agreement for the call option swap corresponds to a first percentage of the notional value of the note.

3. The system of claim 1 wherein the agreement for the credit default swap corresponds to a third percentage of the notional value of the note.

4. The system of claim 1 wherein the credit event comprises one of the group of: bankruptcy, missed payment and restructuring of debt.

5. The system of claim 1 wherein the credit risk rating of the note is further based on a risk rating of an issuer of the note and a risk rating of the second entity.

6. The system of claim 1 wherein an issuer of the note comprises a trust.

7. A non-transitory computer readable storage medium having stored thereon computer executable instructions that, when executed on a computer, configure the computer to perform a method comprising:
   accessing and processing data regarding a call option swap, entered into first, with one or more counter-parties and a credit default swap, entered into second, with one or more counterparties;
   accessing and processing data regarding a note that is issued to a noteholder in exchange for payment of a notional value, the note having a maturity date, being associated with one or more credit events, being backed by an equity share in a first entity via the call option swap with one or more counter-parties and having a credit risk rating based on a risk rating of a bond issued by a second entity via the credit default swap with one or more counter-parties; and wherein, if one of the one or more credit events occurs prior to the maturity date, the note is terminated and the bond issued by the second entity is delivered to the noteholder;

calculating a payment to the noteholder equal to a principal value of the note plus any appreciation in a value of the equity share from an issue date of the note to the maturity date of the note if none of the one or more credit events occur prior to the maturity date; and tracking the maturity date of the note and the one or more credit events.

8. The non-transitory computer readable storage medium of claim 7 wherein an agreement for a call option swap is entered into for a first percentage of the notional value.

9. The non-transitory computer readable storage medium of claim 7 wherein an agreement for a credit default swap is entered into for a third percentage of the notional value.

10. The non-transitory computer readable storage medium of claim 7 wherein the credit event comprises one of the group of: bankruptcy, missed payment and restructuring of debt.

11. The non-transitory computer readable storage medium of claim 7 wherein the credit risk rating of the note is further based on a risk rating of an issuer of the note and a risk rating of the second entity.

12. The non-transitory computer readable storage medium of claim 7 wherein an issuer of the note comprises a trust.

13. The non-transitory computer readable storage medium of claim 7, wherein the computer is further configured to access and process data regarding an interest rate swap with one or more counter-parties.

14. The non-transitory computer readable storage medium of claim 13 wherein an agreement for an interest rate swap is entered into for a second percentage of the notional value.

15. The computer system of claim 1, wherein the processor further accesses and processes data regarding an interest rate swap with one or more counter-parties.

16. The system of claim 15 wherein the agreement for the interest rate swap corresponds to a second percentage of the notional value of the note.

17. A computer system comprising:
memory operable to store at least one program; and
at least one processor communicatively coupled to the memory, in which the at least one program, when executed by the at least one processor, causes the at least one processor to:
access and process data regarding a credit default swap, entered into first, with one or more counter-parties and a call option swap, entered into second, with one or more counterparties;
access and process data regarding a note that is issued to a noteholder in exchange for payment of a notional value, the note having a maturity date, being associated with one or more credit events, being backed by an equity share in a first entity via the call option swap with one or more counter-parties and having a credit risk rating based on a risk rating of a bond issued by a second entity via the credit default swap with one or more counter-parties;
wherein, upon occurrence of one of the one or more credit events prior to the maturity date, the bond issued by the second entity is delivered to the noteholder;
calculate a payment based on a principal value of the note plus any appreciation in a value of the equity share from an issue date of the note to the maturity date of the note if none of the one or more credit events occur prior to the maturity date; and
track the maturity date of the note and the one or more credit events.

18. The system of claim 17 wherein the agreement for the call option swap corresponds to a first percentage of the notional value of the note.

19. The system of claim 17 wherein the agreement for the credit default swap corresponds to a third percentage of the notional value of the note.

20. The system of claim 17, wherein the processor further accesses and processes data regarding an interest rate swap with one or more counter-parties.

21. The system of claim 20 wherein the agreement for the interest rate swap corresponds to a second percentage of the notional value of the note.

22. The system of claim 17 wherein the credit event comprises one of the group of: bankruptcy, missed payment and restructuring of debt.

23. The system of claim 17 wherein the credit risk rating of the note is further based on a risk rating of an issuer of the note and a risk rating of the second entity.

24. The system of claim 17 wherein an issuer of the note comprises a trust.

25. A non-transitory computer readable storage medium having stored thereon computer executable instructions that, when executed on a computer, configure the computer to perform a method comprising:
accessing and processing data regarding a credit default swap, entered into first, with one or more counter-parties and a call option swap, entered into second, with one or more counterparties;
accessing and processing data regarding a note that is issued to a noteholder in exchange for payment of a notional value, the note having a maturity date, being associated with one or more credit events, being backed by an equity share in a first entity via the call option swap with one or more counter-parties and having a credit risk rating based on a risk rating of a bond issued by a second entity via the credit default swap with one or more counter-parties; and
wherein, if one of the one or more credit events occurs prior to the maturity date, the note is terminated and the bond issued by the second entity is delivered to the noteholder;
calculating a payment to the noteholder equal to a principal value of the note plus any appreciation in a value of the equity share from an issue date of the note to the maturity date of the note if none of the one or more credit events occur prior to the maturity date; and
tracking the maturity date of the note and the one or more credit events.

26. The non-transitory computer readable storage medium of claim 25 wherein an agreement for a call option swap is entered into for a first percentage of the notional value.

27. The non-transitory computer readable storage medium of claim 25 wherein an agreement for a credit default swap is entered into for a third percentage of the notional value.

28. The non-transitory computer readable storage medium of claim 25, wherein the computer is further configured to access and process data regarding an interest rate swap with one or more counter-parties.

29. The non-transitory computer readable storage medium of claim 28 wherein an agreement for an interest rate swap is entered into for a second percentage of the notional value.

30. The non-transitory computer readable storage medium of claim 25 wherein the credit event comprises one of the group of: bankruptcy, missed payment and restructuring of debt.

31. The non-transitory computer readable storage medium of claim 25 wherein the credit risk rating of the note is further based on a risk rating of an issuer of the note and a risk rating of the second entity.

32. The non-transitory computer readable storage medium of claim 25 wherein an issuer of the note comprises a trust.

\* \* \* \* \*

UNITED STATES PATENT AND TRADEMARK OFFICE
CERTIFICATE OF CORRECTION

PATENT NO. : 8,429,043 B2
APPLICATION NO. : 10/465462
DATED : April 23, 2013
INVENTOR(S) : Glicksman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1193 days.

Signed and Sealed this
Sixteenth Day of December, 2014

Michelle K. Lee
*Deputy Director of the United States Patent and Trademark Office*